United States Patent Office 3,641,053
Patented Feb. 8, 1972

3,641,053
O-ACYL DECARBAMOYL MITOMYCINS
Keizo Uzu, Kinichi Nakano, and Toshinaka Takahashi, Tokyo-to, Japan, assignors to Kyowa Hakko Kogyo Kabushiki Kaisha, Tokyo-to, Japan
Filed July 8, 1969, Ser. No. 839,923
Claims priority, application Japan, July 23, 1968, 43/51,645
Int. Cl. C07d 27/54
U.S. Cl. 260—326.3                    7 Claims

ABSTRACT OF THE DISCLOSURE

Compounds of the formula

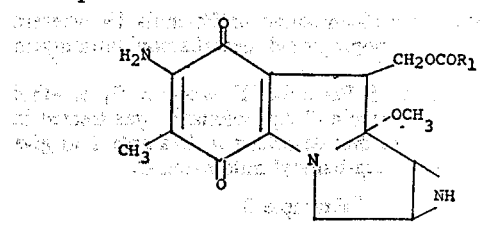

Figure 1:
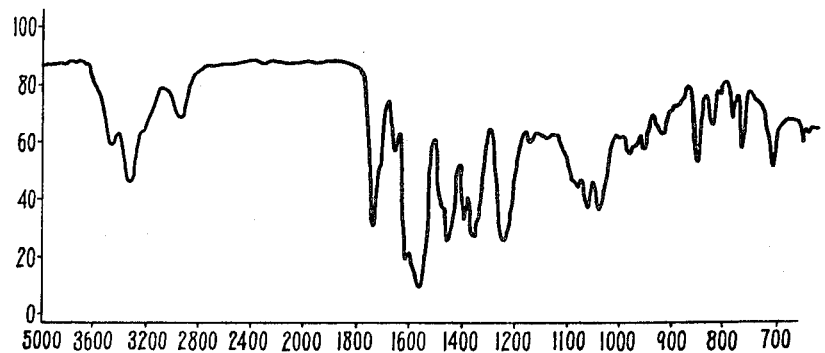

and a process for their preparation are provided wherein $R_1$ is lower alkyl or substituted lower alkyl. These compounds are antibiotics.

BACKGROUND OF THE INVENTION AND DESCRIPTION OF THE PRIOR ART

The mitomycin of the formula

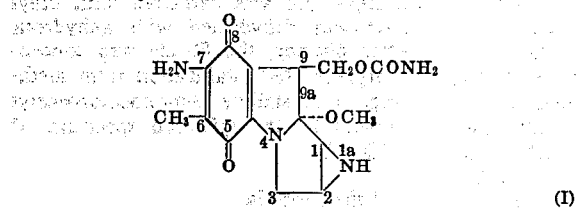

is a known antibiotic and, additionally, finds use in treating tumors. This mitomycin, however, is strongly toxic and has undesirable side effects.

A process for preparing a derivative of the mitomycin of Formula I of the formula

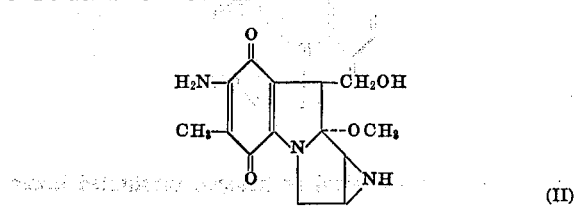

is disclosed in our copending application Ser. No. 814,278, filed Apr. 8, 1969. The compound of Formula II will be referred to herein as decarbamoyl mitomycin C. As disclosed in our copending application Ser. No. 814,278, decarbamoyl mitomycin C can be produced by reacting the mitomycin of Formula I with an alkali metal alcoholate in an organic solvent. The alcoholate of a primary, secondary or tertiary alcohol may be employed as a nucleophilic reagent in an organic solvent (e.g., alcohol, tetrahydrofuran, dioxane, dimethyl formamide, benzene). The reaction is preferably carried out at ambient temperature. Dry Ice in excess of the quantity necessary to neutralize the solution is added to the reaction mixture to neutralize excess alkali and the reaction mixture is then concenrtated in vacuo. The residue obtained after concentration is combined with acetone to extract the reaction product. The extract is concentrated and then purified, for example, by using silica-gel chromatography to obtain decarbamoyl mitomycin C of Formula II.

A process is disclosed in our copending application Ser. No. 814,278 which may be used for preparing derivatives of decarbamoyl mitomycin C of Formula II of the formula

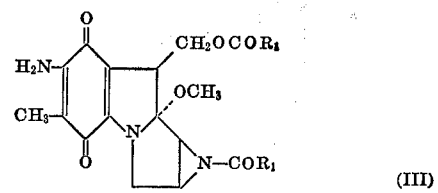

wherein $R_1$ is lower alkyl or substituted lower alkyl (e.g., halogen substituted lower alkyl). These acyl derivatives of decarbamoyl mitomycin C of Formula III may be prepared by subjecting decarbamoyl mitomycin C of Formula II to acylation to convert the $CH_2OH$ group at the 9-position into a $CH_2OCOR_1$ group and to convert the hydrogen atom at the 1a-position into a $R_1CO$ group wherein $R_1$ is lower alkyl. Acylation is conducted by dissolving decarbamoyl mitomycin C of Formula II in a suitable solvent and adding an acid halide or acid anhydride or by condensing decarbamoyl mitomycin C of Formula II with lower carboxylic acid in the presence of a dehydrating condensing agent such as dicyclohexylcarbodiimide. Excess organic base is added to the reaction mixture for the purpose of preventing decomposition of the reaction product by acid which may be formed during the acylation reaction.

DESCRIPTION OF THE INVENTION

An object of the present invention is the provision of derivatives of the compounds of Formula III which are effective antibiotics. A further object of the present invention is the provision of a process for preparing these derivatives of the compounds of Formula III.

According to the present invention, derivatives of the compounds of Formula III of the formula

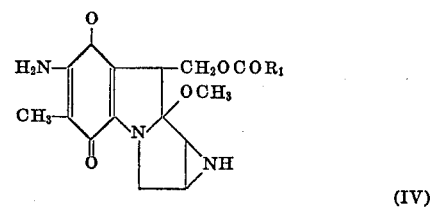

and a process for their preparation is provided wherein $R_1$ is lower alkyl or substituted lower alkyl (e.g., halogen substituted lower alkyl).

According to the present invention, a process is provided for preparing compounds of Formula IV characterized by treating a compound of Formula III wherein $R_1$ is lower alkyl or substituted lower alkyl (e.g., halogen substituted lower alkyl) in a weakly alkaline solution to deacylate the N-acyl group.

According to the present invention, the diacylate of Formula III wherein $R_1$ is lower alkyl or substituted lower alkyl is dissolved in a water-miscible organic solvent (e.g., ethanol, methanol, acetone, tetrahydrofuran, dimethylformamide) and is combined with a weakly alkaline solution (e.g., a solution of sodium bicarbonate, sodium carbonate or ammonia). The mixture is allowed to stand at ambient temperature and, as a result, the N-acyl group is first removed followed by the deacylation of the O-acyl group. The hydrolysis may proceed stepwise as shown in the following reaction sequence wherein $R_1$ is lower alkyl or substituted lower alkyl. The reaction velocity may vary depending upon the properties of the starting materials, weakly alkaline solution, etc. used.

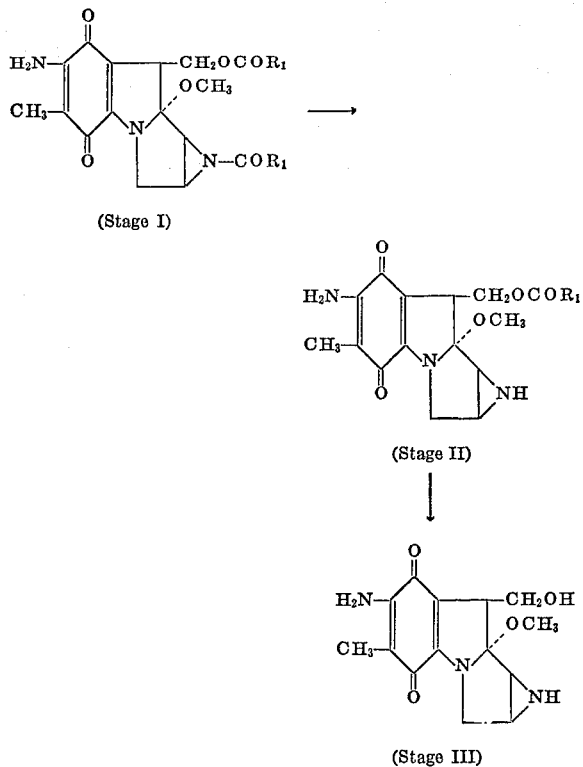

In order to obtain the desired products with best yield, it is advantageous to discontinue the reaction at stage II by the proper selection of hydrolyzing agent and reaction time. For example, when the reaction is carried out at ambient temperature, best results can be obtained by carrying out the reaction in 10% NaHCO$_3$ solution for 24 hours in the case where R$_1$ is ClCH$_2$.

The minimum concentration of representative O-monoacyl compounds of Formula IV in $\gamma$/ml. of solution necessary to inhibit the growth of four representative types of pathogenic bacteria is shown in Table 1 as well as the LD$_{50}$ value for two of the three representative compounds. As is apparent from the table, the compounds of the present invention have strong antibacterial activity and a low LD$_{50}$ (mice, intravenous) so that the chemiccal therapeutical index is significantly improved. Moreover, the antitumor activity may be equal to or larger than that of the mitomycin of Formula I.

TABLE 1

| Bacteria: | R$_1$=CH$_3$CO | C$_2$H$_5$CO | ClCH$_2$CO |
|---|---|---|---|
| Bacillus subtilis (ATCC 6633) | 0.0039 | 0.0156 | 0.195 |
| Escherichia coli (ATCC 14948) | 0.156 | 0.24 | 3.125 |
| Staphylococcus aureus (ATCC 21027) | 0.048 | 0.092 | 6.24 |
| Pseudomonas aeruginosa (ATCC 15246) | 3.12 | 6.24 | >25 |
| LD$_{50}$ (mg./kg.) | 88.8 | | 45 |

The following non-limitative examples illustrate the invention:

Example 1

Preparation of the compound of Formula IV wherein R$_1$ is methyl (O-monoacetyl decarbamoyl mitomycin C):

One hundred (100) milligrams of the compound of Formula III wherein R$_1$ is methyl (diacetyl decarbamoyl mitomycin C) were dissolved in a small amount (about 2 ml.) of acetone and combined with 5 ml. of a 10% aqueous solution of NaHCO$_3$. The mixture was allowed to stand at ambient temperature. The reaction mixture was extracted with ethyl acetate and the extract was dehydrated with anhydrous sodium sulfate. After filtration, the filtrate was concentrated to dryness and subjected to column chromatography using 50 g. of silicagel. Developing and eluting with a solvent of chloroform-acetone(1:1), a small amount of the unreacted starting material was first eluted and O-monoacetyl decarbamoyl mitomycin C was then eluted. The main fraction was concentrated in vacuo to give 59.5 mg. of crystalline powder the infrared spectrum of which is shown in FIG. 1.

Example 2

Preparation of the compound of Formula IV wherein R$_1$ is ethyl (O-monopropionyl decarbamoyl mitomycin C):

The compound of Formula III wherein R$_1$ is ethyl (decarbamoyl mitomycin C dipropionate) was treated in a similar manner to that described in Example 1 to give O-monopropionyl decarbamoyl mitomycin C.

Example 3

Figure 2:
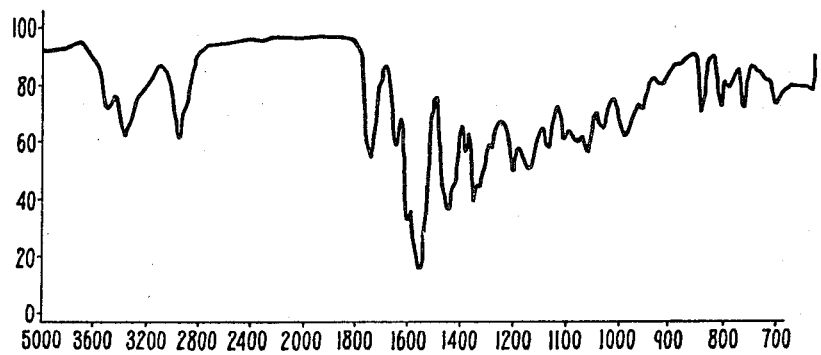

Preparation of the compound of Formula IV wherein R$_1$ is chloromethyl (O-monochloroacetyl decarbamoyl mitomycin C):

Three hundred (300) milligrams of the compound of Formula III wherein R is chloromethyl (dichloroacetyl decarbamoyl mitomycin C) were combined with 5 ml. of acetone and 15 ml. of 10% aqueous sodium bicarbonate solution. The mixture was allowed to stand for 24 hours at ambient temperature and was extracted with ethyl acetate. The extract was dehydrated with anhydrous sodium sulfate. After filtering, the filtrate was concentrated in vacuo to dryness. Recrystallization from methanol yielded 160 mg. of crystalline O-monochloroacetyl decarbamoyl mitomycin C, the infra-red spectrum of which is shown in FIG. 2.

We claim:

1. A compound of the formula

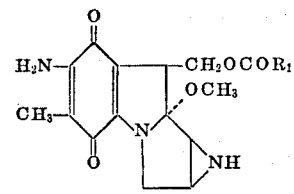

wherein R$_1$ is lower alkyl or halogen substituted lower alkyl.

2. The compound of claim 1 wherein R$_1$ is methyl.
3. The compound of claim 1 wherein R$_1$ is ethyl.
4. The compound of claim 1 wherein R$_1$ is chloromethyl.
5. A process for preparing the compound of claim 1 wherein a compound of the formula

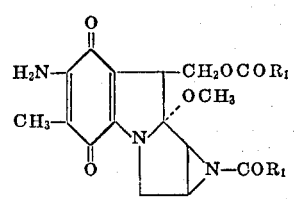

wherein $R_1$ is lower alkyl or halogen substituted lower alkyl is subjected to partial deacylation with a weakly alkaline solution selected from the group consisting of a sodium bicarbonate solution, a sodium carbonate solution, or an ammonia solution.

6. The process of claim 5 wherein the reaction is conducted in the presence of a water-miscible organic solvent.

7. The process of claim 6 wherein the water-miscible organic solvent is ethanol, methanol, acetone, tetrahydrofuran or dimethylformamide.

References Cited

UNITED STATES PATENTS 3,429,894   2/1969   Matsui et al. _____ 260—326.3

NICHOLAS S. RIZZO, Primary Examiner

J. A. NARCAVAGE, Assistant Examiner

U.S. Cl. X.R.

260—999